Oct. 30, 1951
O. K. COLEMAN
2,573,407
APPARATUS FOR MEASURING EXCESS REACTIVE
KILOVOLTAMPERE DEMAND
Filed Oct. 15, 1948
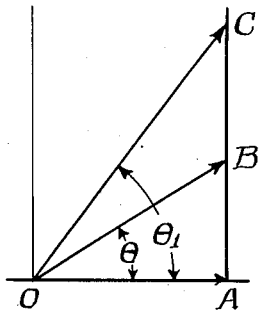
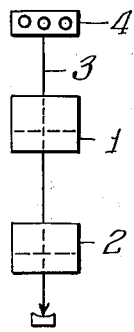
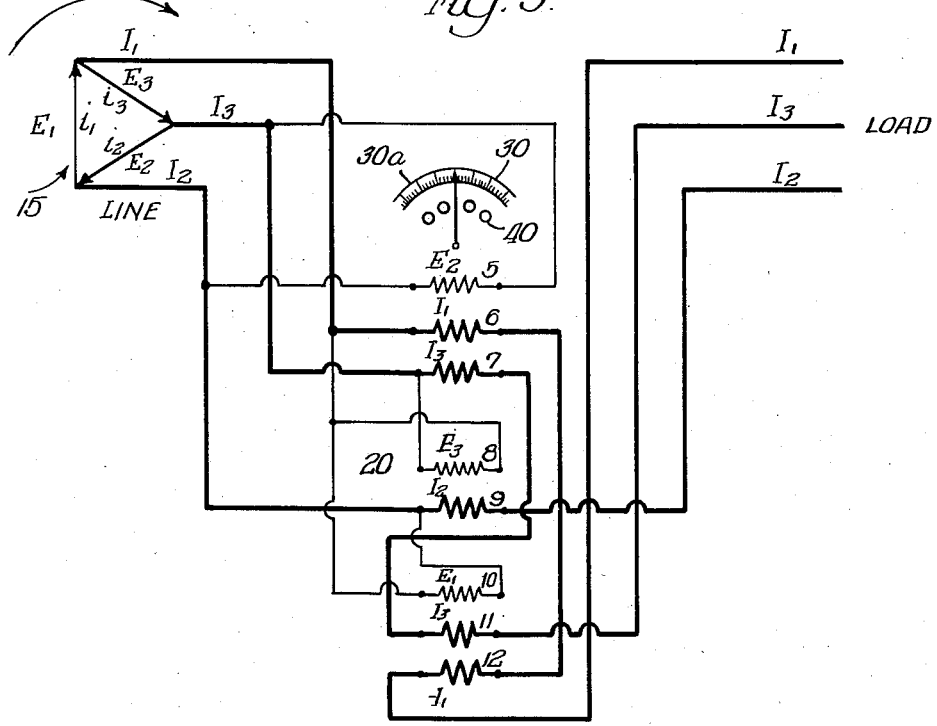
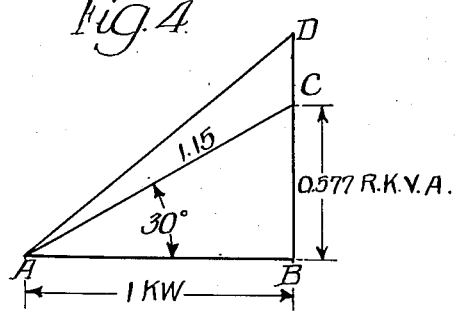
INVENTOR.
Orville K. Coleman,
BY Brown, Jackson,
Boettcher & Dienner
Attys.

Patented Oct. 30, 1951

2,573,407

UNITED STATES PATENT OFFICE 2,573,407

APPARATUS FOR MEASURING EXCESS REACTIVE KILOVOLTAMPERE DEMAND

Orville K. Coleman, West Lafayette, Ind.

Application October 15, 1948, Serial No. 54,662

6 Claims. (Cl. 171—34)

The present invention relates to an improved method of and apparatus for measuring excess reactive kilovoltampere demand. In the distribution of alternating current electric power, recognition must be given to a number of factors in order to obtain an equitable distribution of the operating costs. The consumer is primarily interested in the energy consumed, since this represents the work performed or the heat generated in the numerous operations associated with the manufacture of devices or in the operation of domestic electric appliances. All such energy, whether lost as heat or converted to useful purpose, is usually measured in kwh. and the demand in kw.

In order to utilize the energy supplied by the power company, it is usually necessary for the consumer to install transformers, motors and numerous auxiliary devices. Such equipment, while absorbing considerable energy in the form of heat which is paid for by the consumer, also requires that the power company supply the magnetizing or wattless current necessary to maintain it in operating condition on the line. This wattless current or power performs no useful work, but merely circulates to-and-fro between the customer's equipment and the generators in the central station, thereby heating all the equipment and limiting its capacity to do useful work.

As is well known in the art, a consideration of these facts has led to the application of power factor clauses which take into consideration the cost of supplying this magnetizing current in terms of the equipment necessary to serve the customer at these lower values of power factor.

The conditions prevailing in many power systems are such that the power factor remains reasonably constant at some value below unity during all periods of the day when the loads are at or in the vicinity of the maximum daily demand. As a result, much of the central station equipment is designed to operate at reduced power factors, as for example 85% lag. It can be shown that for power factors between unity and, say 85% lag, the power company is not seriously limiting its generating capacity through the continuous supply of wattless power required by the customer's equipment. At lower power factors, however, the customer is limiting the ultimate generating capacity of the central station. Under such conditions the power company should be reimbursed for the magnetizing current or wattless energy which it supplies in excess of that demanded by the customer to establish a power factor of, say 85% or any other power factor as may be determined by the operation conditions of the entire system.

The general object of the present invention is to provide an improved method of and apparatus for measuring excess kilovoltamperes demand energy, and more particularly to an improved method and arrangement for connecting the circuits of an electric watthour meter to a power supply system in a manner which enables it to indicate the demand and integrate the wattless component (kilovars) for all loads at power factors below some predetermined value.

Other objects, features and advantages of the invention will appear from the following detailed description of one preferred embodiment thereof. In the accompanying drawing illustrating such embodiment:

Figure 1 is a vector diagram of the signficant electrical quantities to be considered in connection with the invention.

Figure 2 is a diagram of the improved instrument or meter of my invention showing the two meter elements connected in counter-torque relationship to the totalizing register.

Figure 3 is a circuit diagram of electrical connections in this instrument, and

Figure 4 is an explanatory vector diagram.

The significance of the above described electrical quantities may best be explained by reference to Figure 1 which serves to illustrate the vector relations in either a single phase or poly phase circuit. The distance OA in Figure 1 represents to scale the momentary load on the system in kw., while the line AB at right angles to OA represents the wattless or reactive component required to magnetize the equipment installed on the consumer's premises. The vector sum of OA and AB shown as OB is the apparent power or k. v. a. Likewise, the ratio $$\frac{OA}{OB}$$

is the power factor usually referred to as cos θ.

Should the magnetizing component now be increased by an amount BC, the apparent power will increase to the value OC, and the power factor will drop to the ratio $$\frac{OA}{OC}$$

One object of the present invention will be that of measuring the value BC, i. e. the amount by which the reactive kva. demand exceeds that which would be required to maintain the power factor of the load at the value cos θ. Figure 1 may further be used for visualizing the process by means of which this is accomplished.

Referring now to Figure 2, let us assume the existence of two conventional watthour meter elements 1 and 2 mounted on a common shaft 3. Let meter element 1 be arranged to deliver a torque to the shaft 3 in a counter-clockwise direction and proportional to the true energy or power component OA in Figure 1. Further, let element 2 be arranged to deliver a torque to the shaft 3 in a clockwise direction (i. e. opposite to that of meter element 1) and proportional to the reactive or wattless component—but which at the power factor shown in Figure 1 as cos $\theta$ has the absolute value OA the same as the energy component. In other words, a wattless component of value AB, will produce in the meter element 2 a torque equal to that produced in the meter element 1 by the energy component OA when the power factor is cos $\theta$. Under these conditions, the torques of the two elements balance and there is no rotation of the shaft 3. If now the power factor is lowered to a value cos $\theta_1$ illustrated in Figure 1, the additional wattless component BC will produce in the element 2 a torque on the shaft 3 in a clockwise direction equal to $$\frac{OA}{AB} \times BC$$

In other words, the torques produced by a given number of volt amperes in each element are in the ratio $$\frac{OA}{AB}$$

This ratio may be adjusted by design to any value suited to the needs of the particular problem under consideration.

If the shaft 3 is prevented from rotating in a counter-clockwise direction by suitable ratcheting means, such a combination may be used for the purpose of measuring the r. k. v. a. h. (reactive kilovoltampere hour) and r. k. v. a. (reactive kilovoltampere) demand for all power factors below some predetermined value of power factor. The registering mechanism shown at 4 in Figure 2 must, however, be suitably geared to take into consideration the ratio $$\frac{OA}{AB}$$

in order to record the true r. k. v. a. h. and r. k. v. a. demand. All of this will be further explained in connection with Figure 3 showing the application of the invention to a typical three-phase three-wire system.

In Figure 3, the reference character 15 represents a conventional three-phase three-wire delta connected system in which $E_1$, $E_2$, and $E_3$ are the alternating current line voltages, and $i_1$, $i_2$, and $i_3$ are the three vector currents within the network, while $I_1$, $I_2$ and $I_3$ are the three line currents. All of these are vector quantities and the resultant power factor may have any value depending upon the characteristics of the customer's load. The reference numeral 20 represents a conventional three-element watthour meter, but which in the present instance is provided with additional current coils for the purpose of measuring the excess r. k. v. a. h. and r. k. v. a. demand, as will be shown. Additionally, the meter 20 is provided with a conventional demand register 30 having the demand scale 30a and totalizing register 40.

The three watthour meter elements, coupled to a common shaft such as the shaft 3 of Figure 2 and arranged to drive the register 30, are represented and arranged as follows. The top meter element comprises the potential coil 5 and the two current coils 6 and 7. The designations $E_2$, $I_1$ and $I_3$ have also been added to indicate the voltage to which the potential coil is connected, and the particular line currents which traverse the current coils.

The middle meter element comprises the potential coil 8 and current coil 9. The lower meter element comprises the potential coil 10 and the current coils 11 and 12.

Referring now to the generating system 15, the power supplied to the load is represented by the equation:

$$P = E_1 i_1 + E_2 i_2 + E_3 i_3$$

and we have additionally $$i_1 - i_3 = I_1$$
$$i_3 - i_2 = I_3$$
$$i_2 - i_1 = I_2$$

also $$E_1 + E_2 + E_3 = 0$$

Making use of these equations, we have $$P = E_1 I_1 - E_2 I_3$$

This is the true energy component expressed in watts.

Referring now to Figure 3, it is assumed that the current coils 6, 7, 9, 11 and 12 have the same number of turns and are wound in the same direction about their respective cores. Furthermore, the potential coils 5, 8 and 10, have the same number of turns which are wound in the same direction about their respective cores. As a result, each combination of current coil with its associated potential coil will produce the same torque for a given number of volt amperes at a specified power factor.

All terminals on the left are considered positive so that with like sense of current and potential on each coil, the meter element will deliver a forward torque whereas if the sense of the current or potential is reversed the torque will be reversed. It is to be noted that the potential coil 10 and current coil 12 as connected into the system give a torque component proportional to $-E_1 I_1$, since the line current is shown traversing the coil 12 in the reverse sense. Likewise, the potential coil 5 and current coil 7 contribute a torque proportional to $E_2 I_3$, and the sum of these two elements produces a backward torque proportional to the power of k. w. delivered to the load. In order to arrive at the equation for reactive voltamperes it is only necessary to rewrite the equation for power in which the voltages are all replaced by voltages lagging 90° to those previously used. These are readily obtained from the vector relations existing in the generator 15 of Figure 3.

We note that a voltage lagging $E_1$ by 90° is $(E_2 - E_3)$ but its magnitude is obviously $\sqrt{3} E_1$. Similar conditions exist in respect to $E_2$ and $E_3$, so if $R_r$ represents the reactive volt-ampere load on the system, we have—

$$\sqrt{3} R_r = (E_2 - E_3) i_1 + (E_3 - E_1) i_2 + (E_1 - E_2) i_3$$
$$= E_1 (i_3 - i_2) + E_2 (i_1 - i_3) + E_3 (i_2 - i_1)$$

or $$\sqrt{3} R_r = E_1 I_3 + E_2 I_1 + E_3 I_2$$

Figure 3 illustrates this combination of current and potential coils through association of coils 5—6; 8—9; and 10—11. Under these conditions, there is produced a forward torque proportional to $\sqrt{3}$ r. v. a. Since the proportionality factor is the same for all current and potential coil combinations, there will be no tendency for the disk to rotate when $$kw. = \sqrt{3}\ r.\ k.\ v.\ a.$$

or when $$tg\phi = .577$$

corresponding to a power factor of .866. This condition is illustrated in Figure 4 and for a load of 1 k. w. If now the reactive component is increased by the value CD the torque of the meter will be in a forward direction by an amount $\sqrt{3}$ CD, as previously indicated. Under these conditions, if the meter were geared to read k. w. h. correctly it would record $\sqrt{3}$ r. k. v. a. h. In the present instance and considering the practical requirements, the meter register has its gearing or register ratio increased in the ratio $\sqrt{3}$, so that it will record the true r. k. v. a. h. In addition, the moving system is provided with a suitable ratchet to prevent reverse rotation if for any reason the power factor falls below .866 where reverse rotation would otherwise take place. The meter, being provided with a demand register, 30, geared in the same ratio, will also indicate the demand in r. k. v. a. By suitably selecting the relative turns in the coils 6, 9 and 11 as compared with coils 7 and 12, it is possible to adjust the meter so as to record the r. k. v. a. h. and r. k. v. a. demand for power factors other than that indicated above, and in each instance it will be necessary to alter the register ratio in the proper proportion.

The power factor for which the meter is adjusted will be determined by the value at which the k. w. and r. k. v. a. on the system produce equal but opposite torques on the moving system of the meter.

The present instance has been used to illustrate an application of the method for the reason that it is quite common practice to introduce power factor clauses into rate schedules which are based on applying a charge for reactive k. v. a. when the power factor of the load falls below some value in the order of 85%. For simplicity, 86.6% has been illustrated.

Similar applications of the method and apparatus can readily be devised by those skilled in the art for application to other networks such as single phase circuits, and 4-wire three-phase, it being only necessary to combine in a single meter negative torques proportional to the k. w. and positive torques proportional to r. k. v. a., these being so proportioned to one another that the net torque is zero at the required value of power factor. Then, by the introduction of proper gear ratios, and a ratchet to prevent reverse rotation, the meter, if provided with recording dial and indicating demand meter, will record the r. k. v. a. h. and r. k. v. a. demand for power factors below the assigned value.

While I have illustrated what I regard to be the preferred embodiment of my invention and the preferred method of carrying it into effect, nevertheless it will be understood that such are merely exemplary and that numerous modifications and rearrangements may be made therein without departing from the essence of the invention. For example, I would note that the systems of connection are equally applicable to indicating instruments for instantaneous values of excess kilovar, and would be particularly applicable to thermal demand meters. For thermal demand meters simply use two auxiliary current transformers in the case with the required number of primary windings.

I claim:

1. In apparatus for measuring excess reactive kilovoltampere demand of a variable load in an electrical system, an integrating alternating current watthour meter having in combination at least one coil element for producing a negative torque proportional to the energy component of the load, at least one coil element for producing a positive torque which is proportional to the reactive component of the load, the latter of said coil elements being adapted to provide torques which are equal and opposite to the energy torques provided by the first of said coil elements only with existence of a predetermined value of power factor for said load, an indicating means for indicating and integrating the excessive reactive component for all load conditions in which the power factor is below said predetermined value, said indicating means adapted to be responsively controlled by the differential of said torques produced by said coils as applied to said indicating means, and ratchet means for preventing a reverse movement of said indicating means.

2. In apparatus of the class described which is adapted for use with variable load conditions in electrical systems, the combination of an integrating alternating current watthour meter comprising coil means for producing a negative torque proportional to the energy component of the load, coil means for producing a positive torque proportional to the reactive component of the load, the latter of said coil means being adapted to provide torques which are equal and opposite to the torques provided by said first coil element only with the existence of a predetermined value of power factor for the load, means for preventing reverse rotation of the meter, and indicating means for indicating and integrating the excessive reactive component only for the different load conditions in which the power factor is below the predetermined value responsive to application thereto of said produced torques.

3. In apparatus of the class described which is adapted for use in an electrical system having variable load conditions, the combination of an integrating alternating current watthour instrument comprising a moving system, coil means for producing a negative torque in said moving system proportional to the energy component of the load, coil means for producing a positive torque in said moving system proportional to the reactive component of the load, the latter of said coil means being adapted to provide torques which are equal and opposite to the torques produced by said first coil means only responsive to existence of a predetermined value of power factor for the load, and means for indicating and integrating the reactive component of the load only responsive to existence of power factors below the predetermined value responsive to simultaneous application thereto of said produced torques.

4. In a meter for measuring excess reactive kilovoltampere demand in an electrical system having variable load conditions, the combination of a rotating system comprising a shaft and three meter elements acting thereon, a potential coil and two current coils acting on one of said meter elements, a potential coil and a current coil acting on a second of said meter elements, and a potential coil and two current coils acting on a third of said meter elements, one of said latter current coils being connected in the reverse sense from the other current coils, certain of said coil elements being operative to determine the reactive component of the load and to produce a positive torque on the moving system proportional to the reactive component of the load, and others of said coil elements being simultaneously operative to determine the energy component of the load and to produce a negative torque on the rotating system proportional to the energy component of the load, said other coil elements being operative to provide negative torques which are equal and opposite to said positive torques responsive to existence of a predetermined value of the load power factor, means for preventing the rotating system from rotating in the direction of negative torque, and means responsive to the rotation of the rotating system in the direction of positive torque for indicating and integrating the excessive reactive component for all loads and for power factors below the predetermined value.

5. In apparatus for measuring excess reactive kilovoltampere demand in an electrical system having variable load and power factor conditions, an integrating alternating current watt-hour meter comprising a first coil means arranged to be responsive to variations in the energy component of the load for the system and to provide a negative torque which is proportional to the value of such energy component, a further coil means which is operative to provide a positive torque which varies directly with variation of the load reactive component, the second of said coil means being adapted to be responsive to existence of a predetermined load power factor less than unity to provide torques which are opposite and equal to the torques provided by said first coil means, and to be responsive to variations in power factor below said predetermined power factor to provide proportionately greater values of torques than that provided by said first coil means, and indicating and integrating means arranged to be controlled by said torques provided by both of said coil means for indicating the variations in the load power factor relative to said predetermined value.

6. In apparatus for measuring excess reactive kilovoltampere demand in an electrical system having variable load and power factor conditions, an integrating alternating current watt-hour meter comprising a first coil means arranged to be responsive to variations in the energy component of the load for the system and to provide a negative torque which is proportional to the value of such energy component, further coil means which is operative to provide a positive torque which varies directly with variation of the load reactive component and which provides torques at all loads which are equal and opposite to the torques provided by said first coil means only responsive to existence of a predetermined, below-unity, load power factor, said second coil means being operative to produce larger torques than are produced by said first coil means responsive to existence of a lower power factor in said electrical system and to produce higher torques responsive to existence of power factor values in said electrical system which are larger than said predetermined value, indicating means arranged to be controlled by the application of the respective torques provided by said coil means to integrate and indicate the differential values between said torques as a variation in the load power factor from said predetermined value, and means in said meter for preventing reverse operation of said indicating means responsive to the existence of a power factor higher than that of said predetermined value.

ORVILLE K. COLEMAN.

REFERENCES CITED

The following references are of record in the file of this patent:

UNITED STATES PATENTS

| Number | Name | Date |
| --- | --- | --- |
| 1,308,656 | Burke | July 1, 1919 |
| 1,732,687 | Lenehan | Oct. 22, 1929 |
| 2,266,423 | Holtz | Dec. 16, 1941 |

FOREIGN PATENTS

| Number | Country | Date |
| --- | --- | --- |
| 452,914 | France | Mar. 20, 1913 |
| 273,899 | Germany | May 9, 1914 |